United States Patent
Michienzi et al.

(10) Patent No.: US 10,996,204 B2
(45) Date of Patent: May 4, 2021

(54) METHOD AND APPARATUS FOR SCALING BETWEEN CHROMATOGRAPHIC SYSTEMS USING HIGHLY COMPRESSIBLE FLUIDS

(71) Applicant: Waters Technologies Corporation, Milford, MA (US)

(72) Inventors: Joseph D. Michienzi, Plainville, MA (US); Joshua A. Shreve, Franklin, MA (US); Jason F. Hill, Milford, MA (US); Abhijit Tarafder, Franklin, MA (US); Michael O. Fogwill, South Grafton, MA (US); Keith Fadgen, Hope Valley, RI (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 281 days.

(21) Appl. No.: 15/948,653

(22) Filed: Apr. 9, 2018

(65) Prior Publication Data

US 2018/0292362 A1   Oct. 11, 2018

Related U.S. Application Data

(60) Provisional application No. 62/483,886, filed on Apr. 10, 2017.

(51) Int. Cl.
*B01D 15/40* (2006.01)
*G01N 30/32* (2006.01)
(Continued)

(52) U.S. Cl.
CPC .......... *G01N 30/38* (2013.01); *B01D 15/163* (2013.01); *B01D 15/40* (2013.01); *G01N 30/32* (2013.01);
(Continued)

(58) Field of Classification Search
CPC .............. G01N 30/02; G01N 30/8668; G01N 30/8672; G01N 30/38; G01N 30/8658;
(Continued)

(56) References Cited

U.S. PATENT DOCUMENTS

| 6,153,438 A * | 11/2000 | Blumberg | G01N 30/8651 436/161 |
| 2016/0136544 A1* | 5/2016 | Hudalla | B01D 15/40 210/656 |

FOREIGN PATENT DOCUMENTS

| WO | 2014201222 A1 | 12/2014 |
| WO | 2015023533 A1 | 2/2015 |

(Continued)

*Primary Examiner* — Eric S. McCall
*Assistant Examiner* — Timothy P Graves
(74) *Attorney, Agent, or Firm* — Womble Bond Dickinson (US) LLP; Deborah M. Vernon; Heath T. Misley

(57) ABSTRACT

Methods for transferring a carbon dioxide based separation procedure from a reference chromatographic system to a target chromatographic system involve alternative techniques for determining system pressure drops not attributable to the column. One technique involves leveraging experimental chromatography to develop a correction factor that is a function of at least one correction coefficient and at least one ratio of the differential analyte retention time to the retention time in the reference system. Another technique involves leveraging other experimental measurements of tubing pressure drops under various condition to develop a lookup table that can be used to identify likely tubing pressure drops in the target system. A third technique leverages knowledge of the separation procedure and the target system and the likely nature of the relevant flow to calculate tubing pressure drops in the target system.

6 Claims, 6 Drawing Sheets

(51) Int. Cl.
*G01N 30/46* (2006.01)
*G01N 30/38* (2006.01)
*B01D 15/16* (2006.01)
*G01N 30/86* (2006.01)

(52) U.S. Cl.
CPC ........... *G01N 30/46* (2013.01); *G01N 30/468* (2013.01); *G01N 30/8658* (2013.01); *G01N 30/8672* (2013.01); *G01N 30/8668* (2013.01); *G01N 30/8693* (2013.01); *G01N 2030/8648* (2013.01)

(58) Field of Classification Search
CPC .... G01N 30/32; G01N 30/46; G01N 30/8693; G01N 2030/8648; B01D 15/40; B01D 15/163
See application file for complete search history.

(56) References Cited

FOREIGN PATENT DOCUMENTS

| | | |
|---|---|---|
| WO | 2018022958 A1 | 2/2018 |
| WO | 2018052952 A1 | 3/2018 |

* cited by examiner

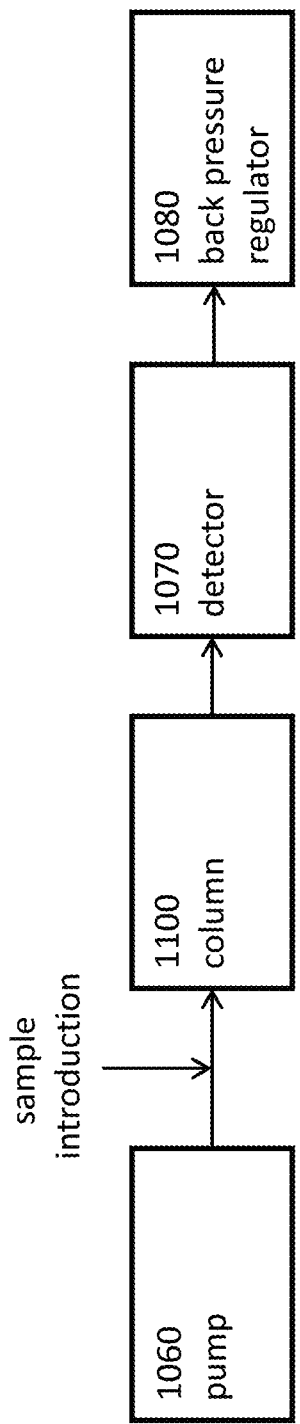
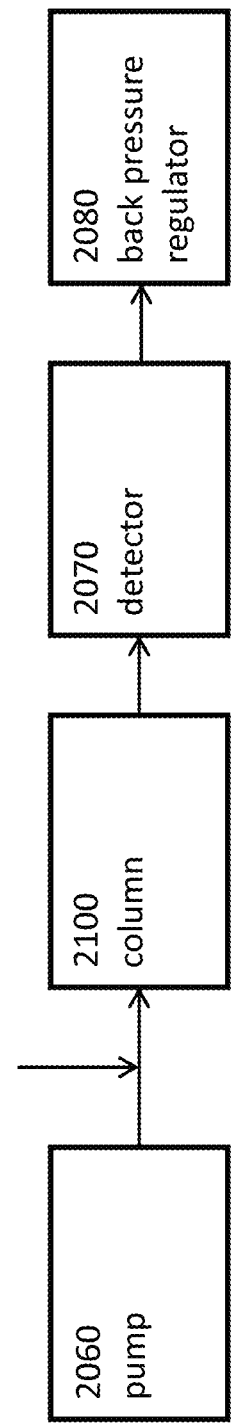

| % Co-solvent | ABPR pressure | ZVV temp. | UPC2 flow rate | $\Delta P_{os}$ | |
|---|---|---|---|---|---|
| 5% methanol | 2000 psi | 30 C | 2 mL/min | 200 psi | } 300 psi (for 2.25 mL/min, 30 C, 2000 psi ABPR) |
| | | | 2.5 mL/min | 400 psi | |
| | | 35 C | 2 mL/min | 150 psi | } 272.5 psi (for 2.25 mL/min, 32.5 C, 2000 psi ABPR) |
| | | | 2.5 mL/min | 340 psi | } 245 psi (for 2.25 mL/min, 35 C, 2000 psi ABPR) |
| | 2500 psi | 30 C | 2 mL/min | 210 psi | } 310 psi (for 2.25 mL/min, 30 C, 2500 psi ABPR) |
| | | | 2.5 mL/min | 410 psi | } 277.9 psi (for 2.25 mL/min, 32.5 C, 2250 psi ABPR) |
| | | 35 C | 2 mL/min | 165 psi | } 283.25 psi (for 2.25 mL/min, 32.5 C, 2500 psi ABPR) |
| | | | 2.5 mL/min | 348 psi | } 256.5 psi (for 2.25 mL/min, 35 C, 2500 psi ABPR) |
| 10% methanol | 2000 psi | 30 C | 2 mL/min | 300 psi | } |
| | | | 2.5 mL/min | 490 psi | |
| | | 35 C | 2 mL/min | 225 psi | } |
| | | | 2.5 mL/min | 400 psi | |
| | 2500 psi | 30 C | 2 mL/min | 320 psi | } |
| | | | 2.5 mL/min | 460 psi | |
| | | 35 C | 2 mL/min | 215 psi | } |
| | | | V = 2.5 mL/min | 405 psi | |

Fig. 6

METHOD AND APPARATUS FOR SCALING BETWEEN CHROMATOGRAPHIC SYSTEMS USING HIGHLY COMPRESSIBLE FLUIDS

RELATED APPLICATIONS

This application claims priority to and the benefit of U.S. Provisional Patent Application No. 62/483,886 titled "METHODOLOGIES FOR SCALING METHODS BETWEEN CHROMATOGRAPHIC SYSTEMS USING HIGHLY COMPRESSIBLE FLUIDS" filed Apr. 10, 2017, which is incorporated herein by reference in its entirety.

TECHNICAL FIELD

The present disclosure relates to supercritical fluid chromatography (SFC) and/or a carbon dioxide based chromatography system. More specifically, the present disclosure relates to methods and systems for matching the performance in a chromatographic system using a highly compressible fluid.

BACKGROUND OF THE INVENTION

Developing a successful chromatographic separation method usually requires extensive experimentation. Such method development often involves the evaluation and optimization of numerous variables. These variables may include the choice of chromatographic system (e.g., carbon dioxide based chromatography, SFC, high pressure liquid chromatography (HPLC), gas chromatography (GC)), the choice of mobile phase and mobile phase compositions, the choice of column chemistry and column dimensions, the choice of detector, etc. Once a successful chromatographic separation method has been developed, it often needs to be transferred and performed on different chromatographic systems. For example, separation on an analytical scale SFC system may need to be transferred and performed on a preparative scale SFC system. Similarly, a preparative scale SFC system may be modified thereby requiring the new separation method to be transferred and performed on a different preparative scale SFC system.

For liquid chromatography, the theory and understanding for transferring methods between different system or column configurations is generally well understood. Guidelines for transferring LC methods are straightforward and typically do not need additional optimization.

When employing a SFC and/or a carbon dioxide based chromatography system, however, effective separation method transfer between different chromatography systems requires special consideration. Chromatographic separations using a mobile phase comprising carbon dioxide that are transferred from one chromatographic system to another chromatographic system typically may need to be re-developed to achieve the same successful separation as achieved on the original chromatographic system.

In WO2014/201222 A1, researchers at Waters Technologies Corporation disclosed a methodology for scaling SFC and/or carbon dioxide based chromatography methods between different systems and/or column configurations. The methodology includes measuring an average mobile phase density from the density profile along the system during a first separation utilizing carbon dioxide as a mobile phase component and substantially duplicating the average density for a second separation to produce similar selectivity and retention factors. The researchers at Waters Technologies Corporation also disclosed that the average of the pressure profile may be used as a close approximation to duplicate average of the density profiles between separations.

In WO2015/023533 A1, researchers at Waters Technologies Corporation disclosed apparatus for regulating the average mobile phase density or pressure in a carbon dioxide based chromatographic system. The disclosed apparatus includes a controller, a set of pressure or density sensors and a set of instructions capable of determining the pressure drop across a column and adjusting at least one system component or parameter to achieve a predetermined average mobile phase density or pressure in the system.

Since filing WO2015/023533 A1, researchers at Waters Technologies Corporation have discovered specific new ways to efficiently transfer a carbon dioxide-based separation procedure from a first chromatographic system to a second system. The inventors recognized that pressure drops outside the column of a chromatographic system may skew an estimation of an average column pressure based on measurements that include those extra-columnar pressure drops.

SUMMARY OF THE INVENTION

The present disclosure relates to methods and systems for efficiently transferring a carbon dioxide based separation procedure from a reference chromatographic system to a target chromatographic system.

One embodiment of the invention is a method comprising: (a) identifying an average system pressure, an average column pressure, and an elution time for at least one analyte in a carbon dioxide based separation in the reference chromatographic system; (b) modifying at least one characteristic of the tubing between a pump outlet and a column inlet or between a column outlet and a back pressure regulator inlet in the reference chromatographic system to create a modified reference chromatographic system; and (c) identifying an average system pressure, an average column pressure, and an elution time for the at least one analyte in the carbon dioxide based separation in the modified reference chromatographic system; and (d) calculating an elution time differential and a correction coefficient for the at least one analyte in the carbon dioxide based separation. The method further comprises (e) identifying an average system pressure and an elution time for the at least one analyte in the carbon dioxide based separation in a field chromatographic system; and (f) calculating an average column pressure for the carbon dioxide based separation in the field chromatographic system as the product of an average system pressure and the correction factor. The correction factor comprises a function of the elution time, the elution time differential, and the correction coefficient for the at least one analyte in the carbon dioxide based separation.

The foregoing embodiment of the invention may involve chromatography with a plurality of analytes. For example, the chromatography may involve two, three, four, five, or more analytes. When the chromatography involves a plurality of analytes, the method involves calculating an elution time differential for each analyte and the correction factor comprises a function of a plurality of correction coefficients and the elution time differential for each analyte.

The foregoing embodiment of the invention may involve a reference chromatographic system in which either the upstream tubing, the downstream tubing, of both have been modified. The foregoing embodiment of the invention may further involve adjusting a pressure parameter in the carbon dioxide based separation in the field chromatographic system based on the calculated average column pressure.

One embodiment of the invention is a method comprising: (a) identifying a plurality of parameter values for use in a carbon dioxide based separation in the second chromatographic system; and (b) checking a lookup table for a tubing pressure drop associated with the plurality of parameter values. The parameters associated with the plurality of parameter values may comprise one or more of the following: (1) a percentage of modifier, (2) a pump outlet pressure (3) a back pressure regulator pressure, (4) a temperature, and (5) a flow rate. The tubing pressure drop is the difference between a pressure measured near the location of the column in the first chromatographic system and either a pump outlet pressure or a back pressure regulator pressure. The method of this embodiment further comprises (c) applying the tubing pressure drop to determine a column pressure for the carbon dioxide based separation procedure in the second chromatography system; and (d) adjusting one of the plurality of parameter values for use in a carbon dioxide based separation in the second chromatographic system to more closely match the average column pressure for the carbon dioxide based separation in the first chromatographic system.

In one such embodiment of the invention, the method comprises: (b) checking a lookup table for a downstream tubing pressure drop associated with the plurality of parameter values. The downstream tubing pressure drop is the difference between a pressure measured near the location of the outlet of the column in the first chromatographic system and a back pressure regulator pressure. This method further comprises (c) applying the downstream tubing pressure drop to determine a column pressure for the carbon dioxide based separation procedure in the second chromatography system; and (d) adjusting one of the plurality of parameter values for use in a carbon dioxide based separation in the second chromatographic system to more closely match the average column pressure for the carbon dioxide based separation in the first chromatographic system.

In another such embodiment of the invention, the method comprises: (b) checking a lookup table for an upstream tubing pressure drop associated with the plurality of parameter values. The upstream tubing pressure drop is the difference between a pressure measured near the location of the inlet of the column in the first chromatographic system and a pump outlet pressure. This method further comprises (c) applying the upstream tubing pressure drop to determine a column pressure for the carbon dioxide based separation procedure in the second chromatography system; and (d) adjusting one of the plurality of parameter values for use in a carbon dioxide based separation in the second chromatographic system to more closely match the average column pressure for the carbon dioxide based separation in the first chromatographic system.

In accordance with this embodiment of the invention, a tubing pressure drop in the lookup table may be measured using a zero volume connector used to replace the column. The lookup table may comprises a tubing pressure drop associated with each of the plurality of parameter values. A tubing pressure drop in accordance with this embodiment of the invention may be calculated from the lookup table by interpolating between a first tubing pressure drop associated with a value higher than a first of the plurality of parameter values and a second tubing pressure drop associated with a value lower than the first of the plurality of parameter values. Similarly, a tubing pressure drop in accordance with this embodiment of the invention may be calculated from the lookup table by linearly interpolating between a first tubing pressure drop associated with a value higher than a first of the plurality of parameter values and a second tubing pressure drop associated with a value lower than the first of the plurality of parameter values; and between a third tubing pressure drop associated with a value higher than a second of the plurality of parameter values and a fourth tubing pressure drop associated with a value lower than the second of the plurality of parameter values. A tubing pressure drop may be calculated from the lookup table by linearly interpolating between a first tubing pressure drop associated with a value higher than a first of the plurality of parameter values and a second tubing pressure drop associated with a value lower than the first of the plurality of parameter values; between a third tubing pressure drop associated with a value higher than a second of the plurality of parameter values and a fourth tubing pressure drop associated with a value lower than the second of the plurality of parameter values; and between a fifth tubing pressure drop associated with a value higher than a third of the plurality of parameter values and a sixth tubing pressure drop associated with a value lower than the third of the plurality of parameter values. The interpolation may be linear.

BRIEF DESCRIPTION OF THE FIGURES

The foregoing and other features provided by embodiments of the present invention will be more fully understood from the following description when read together with the accompanying drawings.

FIG. 1 illustrates a reference chromatographic system 1000 featuring a pump 1060, a column 1100, a detector 1070, and a back pressure regulator (BPR) 1080.

FIG. 2 illustrates a target chromatographic system 2000 featuring pump 2060, column 2100, detector 2070, and BPR 2080.

FIG. 3A illustrates conditions in which the average system pressure is an accurate estimate of the average column pressure whereas FIG. 3B illustrates conditions in which the average system pressure differs from the average column pressure.

FIG. 6 illustrates an exemplary lookup table with exemplary parameters, parameter values, and interpolation between intermediate parameter values.

DETAILED DESCRIPTION

Figures 3A, 3B:
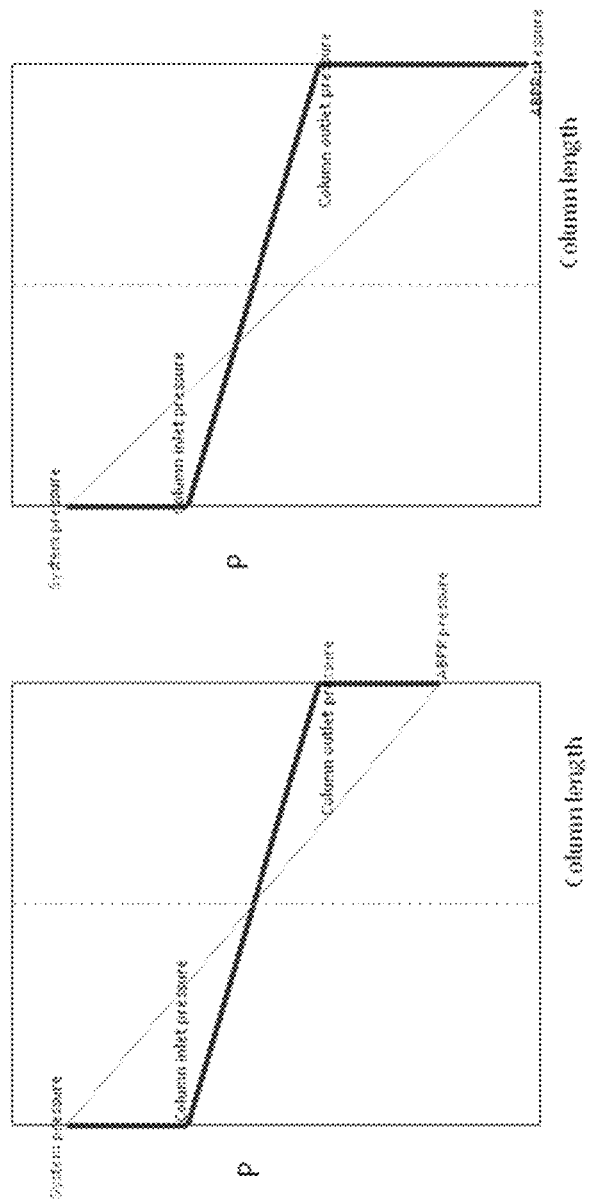

As used herein, the phrase "chromatographic system" refers to a combination of instruments or equipment, e.g., a pump, a column, a detector, and accompanying accessories that may be used to perform a separation to detect target analytes.

In some embodiments, the present disclosure relates to carbon dioxide based separation in a chromatographic system having a pump, a column located downstream of the pump, a detector located downstream of the column, a back pressure regulator located downstream of the detector, and a first sensor and a second sensor. In some such embodiments, the sensors may be pressure sensors for measuring mobile phase pressure in the system. Mobile phase pressure measurements may be used, along with measured or estimated mobile phase temperatures, to estimate the mobile phase density. The first sensor may be contained in or connected to an outlet of a pump, may be contained in or connected to an inlet of a column, or positioned anywhere in between. The second sensor may be contained in or connected to an inlet of a back pressure regulator, may be contained in or connected to an outlet of the column, or positioned anywhere in between.

The present disclosure may be useful for transferring separations between analytical scale chromatographic systems, preparative scale chromatographic systems, and combinations thereof. For example, the present disclosure may be useful in transferring a separation from an analytical scale chromatographic system to a preparative scale chromatographic system, or a preparative scale chromatographic system to an analytical scale chromatographic system. The present disclosure may also be useful in transferring a separation from one analytical scale chromatographic system to another analytical scale chromatographic system, or from one preparative scale chromatographic system to another preparative scale chromatographic system. A list of chromatographic systems for which the present disclosure may be applicable include, but is not limited to, carbon dioxide-based chromatographic systems commercially available from Waters Technologies Corporation (Milford, Mass.) and branded as ACQUITY® $UPC^2$, Method Station SFC, Resolution SFC MS, Preparative SFC Instruments (e.g., Investigator SFC, Prep 100 SFC, SFC 80/200/350 Preparative Systems). Chromatographic systems for which the present disclosure may be applicable may comprise columns designed for use with a mobile phase including carbon dioxide. In some embodiments, columns designed for use with a carbon dioxide containing mobile phase are branded as Waters Technologies Corporation (Milford, Mass.) $UPC^2$ and/or SFC columns including both chiral and achiral stationary phases.

The distinction between different chromatographic systems, e.g., a first chromatographic system and a second chromatographic system, may include any change in the system configuration that results in a change in the overall operating average mobile phase density or average column pressure. For example, the distinction between different chromatographic systems may be the use of different instruments such as a carbon dioxide based analytical chromatographic system, for example a system commercially available from Waters Technologies Corporation (Milford, Mass.) and branded as an ACQUITY® $UPC^2$ system versus a carbon dioxide based preparative chromatography system, for example a system commercially available from Waters Technologies Corporation (Milford, Mass.) and branded as a Prep 100 SFC system. The distinction may also be a change in one or more components on the same instrument, e.g., a change in system configuration. For example, the distinction may be a change in column configuration, e.g. length, internal diameter or particle size, or a change in tubing, e.g., length or internal diameter, a change in a valve, e.g., the addition or removal of a valve, or the addition or removal of system components such as detectors, column ovens, etc.

Preferably, the present disclosure may be applied to any change or distinction, e.g. instrument, column particle size, column length, etc., between different chromatographic systems which results in greater than about a 10% change in overall operating average mobile phase density or average column pressure. More preferably, the present disclosure may be applied to any change or distinction which results in greater than about a 5% change in overall operating average mobile phase density or average column pressure. Even more preferably, the present disclosure may be applied to any change or distinction which results in greater than about a 1% change in overall operating average mobile phase density or average column pressure.

The present disclosure relates to efficiently transferring carbon dioxide based separations between systems. As used herein, the phrase "efficiently transferring" of a carbon dioxide based separation refers to the concept of transferring a carbon dioxide based separation, methodology, or method parameters between chromatographic systems while maintaining the chromatographic integrity of the separation, e.g., preserving retention factors and selectivity of at least one target analyte, preferably two or more target analytes. An efficiently transferred separation is one that substantially reproduces the chromatographic integrity of the separation obtained on the first chromatographic system on the second chromatographic system. For example, an efficiently transferred carbon dioxide based separation is one wherein the second carbon dioxide based separation performed on the second chromatographic system has a target analyte, or target analytes, having substantially the same retention factor (k') or selectivity as the first carbon dioxide based separation performed on the first system.

As used herein, the term "retention factor" or "k'" refers to the ratio of time an analyte is retained in the stationary phase to the time it is retained in the mobile phase under either isocratic or gradient conditions. For an efficiently transferred carbon dioxide-based separation method, the difference in retention factor for any given target analyte between a first and a second separation should be minimized. Preferably, the difference in retention factor for a target analyte between a first and a second separation is less than about 10%. More preferably, the difference in retention factor for a target analyte between a first and a second separation is less than about 5%. Even more preferably, the difference in retention factor for a target analyte between a first and a second separation is less than about 1%.

For multiple target analytes, the difference in retention factor for each target analyte, respectively, between a first and a second separation should also be minimized. Multiple target analytes may include 2 or more target analytes, e.g., 2, 3, 4, 5, 6, 7, 8, 9, 10, etc. Preferably, all or a majority of the target analytes have substantially the same retention factor between the first and second separations. Because all analytes respond differently to system changes, not all of the target analytes may have substantially the same retention factor between the first and second separations. Preferably, the difference in retention factor for each multiple target analyte, respectively, between a first and a second separation is less than about 10%. More preferably, the difference in retention factor for each multiple target analyte, respectively, between a first and a second separation is less than about 5%. Even more preferably, the difference in retention factors for each multiple target analyte, respectively, between a first and a second separation is less than about 1%.

As used herein, the term "selectivity" or "separation factor" or "α" refers to the degree of separation of two analytes in a separation. For example, the separation factor for two analytes, A and B, is the ratio of their respective retention factors, provided A elutes before B, e.g., $\alpha = k'_B / k'_A$. The selectivity between two target analytes between a first and a second separation should be maintained. Preferably, the change in selectivity for two target analytes between a first and a second separation is less than about 10%. More preferably, the change in selectivity for two target analytes between a first and a second separation is less than about 5%. Even more preferably, the change in selectivity for two target analytes between a first and a second separation is less than about 1%.

As used herein, the phrases "carbon dioxide-based separation" and "carbon dioxide-based separation (procedure" refer to method parameters and/or settings used with a particular carbon dioxide based chromatographic system to control or effect a separation of target analytes. The mobile phase in a carbon dioxide-based separation includes at least, in part, carbon dioxide.

FIG. 1 illustrates a chromatographic system 1000 featuring a pump 1060, a column 1100, a detector 1070, and a back pressure regulator (BPR) 1080. A sample is introduced into chromatographic system 1000 of FIG. 1 between pump 1060 and column 1100. Pump 1060 has a flow rate set point. BPR 1080 has a pressure set point. System 1000 experiences pressure dropping from the outlet of pump 1060 to the inlet of BPR 1080. The outlet pressure of pump 1060 is determined by all the pressure-drop related factors. Typically, the pressure drop will predominately occur between the inlet and the outlet of column 1100.

Similar to FIG. 1, FIG. 2 illustrates a chromatographic system 2000 featuring pump 2060, column 2100, detector 2070, and BPR 2080. A sample is introduced into chromatographic system 2000 of FIG. 2 between pump 2060 and column 2100. System 2000 of FIG. 2 and system 1000 of FIG. 1 share a BPR set point. But chromatographic system 2000 of FIG. 2 differs from chromatographic system 1000 in a way that produces a change in the overall operating average mobile phase density or average column pressure.

The difference between system 1000 of FIG. 1 and system 2000 of FIG. 2 may produce a greater pressure drop across column 2100 than across column 1100. Typically pressure drops predominately occur across the column of a chromatographic system. Thus, the average column pressure of the carbon dioxide based separation in the chromatographic system 2000 of FIG. 2 may be greater than the average column pressure of the carbon dioxide based separation in the chromatographic system 1000 of FIG. 1. This is problematic for transfer of the separation from the first chromatographic system to the second chromatographic system. Due to the difference in average column pressure in the chromatographic systems, the average density of the mobile phase and, by extension, the retention characteristics of the analytes in the two separations, will be expected to differ.

Columns differences between chromatographic system include, but are not limited to, differences in particle diameter. Among other ways, columns may differ in length and internal diameter. Column stationary phases may differ in regard to chemistry, base particle, ligand, bonding density, endcapping, pore size, etc. Column manufacturers typically produce columns having the same stationary phase, e.g., same chemistry, same base particle, same ligand, same bonding density, same endcapping and same pore size, in several different particle size and column dimension configurations. In one embodiment, the two different separation systems have a first and a second respective column, wherein the first and second columns have similar stationary phases. The similar stationary phases may have, at least, same chemistry, same base particle, same ligand, same bonding density, same endcapping or same pore size. The present invention is applicable where the columns in two different chromatographic systems have the same stationary phase.

Due to the compressible nature of the carbon dioxide based mobile phase at or near supercritical conditions, the mobile phase density must be managed from the sample introduction to detection. More specifically, the average density of the mobile phase across the column must be conserved in order to match retention characteristics of the analytes.

As disclosed in the prior art, the average column pressure of the mobile phase can be adjusted by adjusting the set point of the BPR. For example, the set point of the BPR 2080 may be selected to address a pressure difference between column 1100 and column 2100. In particular, the set point of BPR 2080 may be decreased in FIG. 2 to produce a lesser average pressure in column 2100 of system 2000. If adjustment of the set point of BPR 2080 causes the average pressure of column 2100 to be substantially the same as the average column pressure of FIG. 1, the retention characteristics of analytes in the separation of FIG. 1 would be expected to substantially match those in the separation of FIG. 2.

The inventors of the present disclosure recognized that, using average pressure as a close approximation for average density, the effect of mobile phase density on solubility and analyte retention can be normalized by substantially duplicating the average column pressure from a separation method in a reference chromatographic system in a separation method in a target chromatographic system. The inventors were aware, however, that the average column pressure in a separation method in a target chromatographic system is typically neither known nor readily ascertainable. Instead, the average system pressure is typically used as a proxy for the average column pressure in a separation method in a target chromatographic system. But such a proxy may not be sufficiently accurate. Accordingly, the inventors have developed novel tools, systems, and methods for determining the average column pressure in a separation method in a target chromatographic system from the average system pressure.

Assuming isothermal conditions within the whole system, average pressure can be measured either (a) from the pump outlet (PO) to the automated back pressure regulator (ABPR) or (b) from the column inlet to the column outlet. The average pressure from the pump outlet (PO) to the automated back pressure regulator (ABPR) is better characterized as the average system pressure. The average pressure from the column inlet to the column outlet is better characterized as the average column pressure. Average system pressure is typically used as an estimate of the average column pressure because transducers are placed at the PO and ABPR.

FIG. 3A is a schematic of conditions in which the average system pressure is an accurate estimate of the average column pressure. In FIG. 3A, the average system pressure is an accurate estimate of the average column pressure because pressure drops across the connecting tubes between the pump outlet and the column inlet and between the column outlet and the ABPR are either (a) negligible, or (b) equal. But the average system pressure may not be the same as the average column pressure.

FIG. 3B is a schematic of conditions in which the average system pressure differs from the average column pressure. In FIG. 3B, the difference between the average system pressure and the average column pressure arises because the pressure drop between the column outlet and the ABPR is significantly greater than the pressure drop across the connecting tubes between the pump outlet and the column inlet. Under certain conditions, e.g. at higher pressures, lower temperatures and with higher liquid co-solvent percent differences between average system pressure and average column pressure may not matter. On the other hand, at lower pressures, higher temperatures and lower co-solvent percents, these mismatch differences between average system pressure and average column pressure may lead to significant errors in method transfer or scale-up.

One embodiment of the invention involves estimating the average column pressure from the measured average system pressure. This embodiment of the invention involves calculating a correction factor F. The correction factor F is the quotient of the average column pressure divided by the average system pressure. Accordingly, the product of the average system pressure and the correction factor F is the average column pressure. This embodiment of the invention is based on experiments carried out with a standard solute mixture and a fixed SFC method on a given column chemistry. Chromatography results from different systems are used. The chromatography results must involve the same solute, method, and column chemistry. The correction factor is derived from deviations in chromatography results.

Figure 4A:
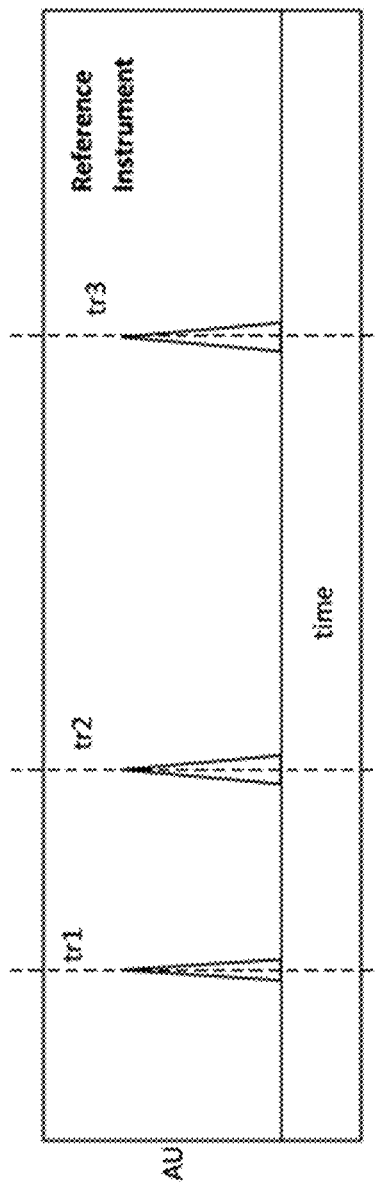
FIGS. 4A and 4B illustrate cartoon chromatograms obtained by two different systems using the same column, the same method, and the and the same sample mixture.
Figure 4B:
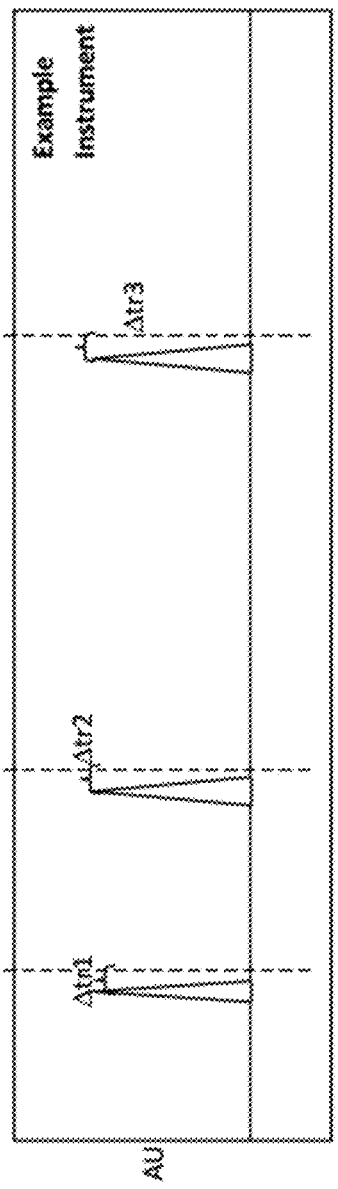

FIGS. 4A and 4B illustrate cartoon chromatograms obtained by two different systems using the same column, the same method, and the and the same sample mixture. In FIG. 4A, the chromatogram of the reference system, the analytes eluted at times tr1, tr2, and tr3 respectively. In the chromatogram of FIG. 4B, the same analytes eluted at a time difference of $\Delta$tr1, $\Delta$tr2, and $\Delta$tr3 as compared with the elution time in the reference system. The chromatogram of FIG. 4B may be obtained using the reference system with modified tubing between the pump outlet and the column inlet and/or with modified tubing between the column outlet and the back pressure regulator. For example, in various experiments, chromatography may be conducted with the inner diameter of the tubing between the pump outlet and the column inlet in the reference system may be modified +/−1%, +/−2%, +/−3%, +/−4%, and/or +/−5%. In other exemplary experiments, chromatography may be conducted with the inner diameter of the tubing between the column outlet and the back pressure regulator in the reference system may be modified +/−1%, +/−2%, +/−3%, +/−4%, and/or +/−5%. For another example, in various experiments, chromatography may be conducted with the length of the tubing between the pump outlet and the column inlet in the reference system may be modified +/−10%, +/−20%, +/−30%, +/−40%, +/−50%, +/−100%, +/−150%, and/or +/−200%. In other exemplary experiments, chromatography may be conducted with the length of the tubing between the column outlet and the back pressure regulator in the reference system may be modified +/−10%, +/−20%, +/−30%, +/−40%, +/−50%, +/−100%, +/−150%, and/or +/−200%. Alternatively, the chromatogram of FIG. 4B may be obtained with a target system using the same column, the same method, and the and the same sample mixture. A correction coefficient for each analyte (i.e., Cn) can be determined by fitting the results of a series of experiments. Experimental values including the elution time of each analyte in the reference system (i.e., trn) and the difference in its elution time in the reference and the other system (i.e., $\Delta$trn) may be used. Where the experiments involve three analytes, values of correction coefficients C1, C2, and C3 can be determined based on elution times tr1, tr2 and tr3, and elution time differences of $\Delta$tr1, $\Delta$tr2, and $\Delta$tr3. The experiments can be carried out by changing the tubing dimensions at the upstream and the downstream of the column, while using the same column, the same sample mixture, and the same method conditions. Changing the tubing dimensions will lead to changes in the retention times of the sample analytes in the system. All the parameters—tr1, tr2, tr3, $\Delta$tr1, $\Delta$tr3, $\Delta$tr3, and the average system pressure—can be measured in the experiments. Additionally, by installing pressure transducers at the column inlet and at the column outlet, the average column pressure of the system can be measured. The values of correction coefficients C1, C2, and C3 can thus be determined through regression of the experimental values.

Once the time of elution of each analyte in the reference system is known and the correction coefficients are determined from the experiments, these parameter values can be used to calculate the correction factor F in any target system as a function of the measured time of elution of each analyte in the target system. In particular, the correction factor F may be a function of the correction coefficient (i.e., C) and the ratio of the retention time difference between the target and reference system and the retention time in the reference system (i.e., $\Delta$tr/tr).

Accordingly, where the experiment involves three analytes, the correction factor F is a function of correction coefficients (i.e., C1, C2, and C3) and the ratio of the retention time difference between the target and reference system and the retention time in the reference system (i.e., $\Delta$tr1/tr1, $\Delta$tr2/tr2, and $\Delta$tr3/tr3). A correction factor F in accordance with the invention need not involve chromatography with three analytes. A correction factor F in accordance with the invention may involve chromatography with more or less analytes. Once the correction factor F is known, the average column pressure is readily determined from the average system pressure as the product of the correction factor F and the average column pressure of the target system.

Once the average column pressure of the target system is determined, it may be compared to the average column pressure in the reference chromatography method. Thereafter, the pressure parameters in the target system may adjusted to better match the average column pressure in the reference chromatography method. For example, if the average column pressure of the target system is greater than the average column pressure in the reference chromatography method, the back pressure regulator in the target system may be adjusted to a lower pressure and/or the pump pressure setting in the target system may reduced. Similarly, if the average column pressure of the target system is less than the average column pressure in the reference chromatography method, the back pressure regulator in the target system may be adjusted to a higher pressure and/or the pump pressure setting in the target system may increased. Thus, the performance of the chromatographic method in the reference system can be replicated with the same/similar chromatographic performance in the target system.

Another embodiment of the invention involves measurements of the pressure drop in a reference system between the pump outlet and the column inlet and/or measurements of the pressure drop in a reference system between the column outlet and the back pressure regulator. Unlike the foregoing embodiment of the invention, this embodiment does not involve experimental chromatography. Instead, this embodiment of the invention involves a series of experiments with a chromatography system in which the column has been replace with a zero volume connector. Typically, a chromatography system includes pressure transducers at the pump outlet and at the back pressure regulator. These pressure transducers measure the pressure at the pump outlet (i.e., $P_{PO}$) and the pressure at the back pressure regulator (i.e., $P_{BPR}$). This embodiment of the invention uses a pressure transducer that measures the pressure at the zero volume connector used to replace the column (i.e., $P_{ZV}$).

Figure 5:
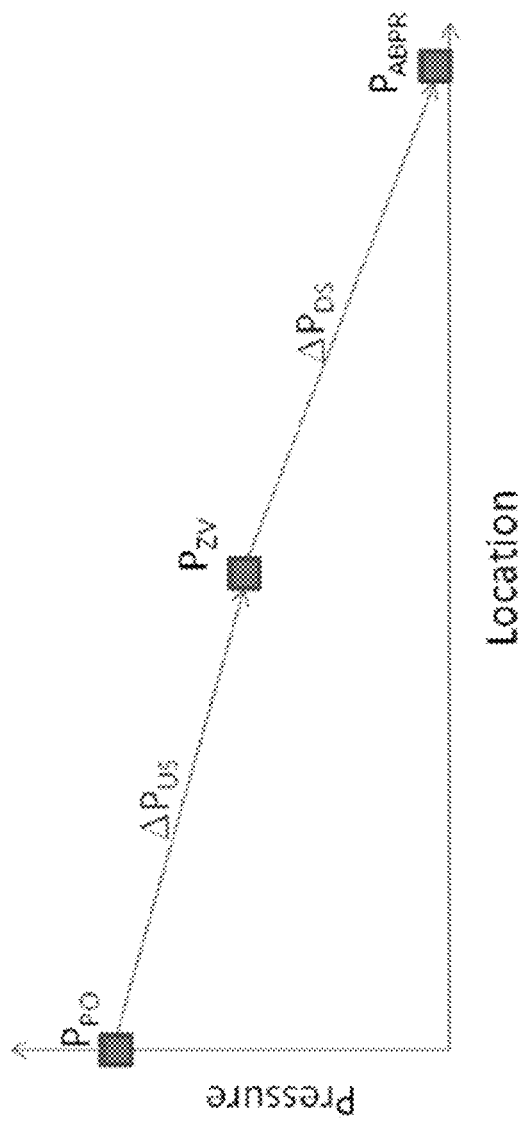
FIG. 5 illustrates pressure drops between the pump outlet and the backpressure regulator inlet.

Under a variety of conditions, measurements of the upstream pressure differential and the downstream pressure differential are experimentally taken. As illustrated in FIG. 5, the upstream pressure drop (i.e., $\Delta P_{US}$) is the difference between the pressure measured at the pump outlet and the pressure measured at zero volume connector used to replace the column (i.e., $\Delta P_{US}=P_{PO}-P_{ZV}$). As also illustrated in FIG. 5, the downstream pressure drop (i.e., $\Delta P_{DS}$) is the difference between the pressure measured at zero volume connector used to replace the column and the back pressure regulator (i.e., $\Delta P_{DS}=P_{ZV}-P_{BPR}$). The upstream pressure drop and the downstream pressure drop each represent the pressure drop across the tubing that connects the column to the chromatography system in normal operation.

In accordance with this embodiment of the invention, the upstream and/or downstream pressure drops may be measured as a function of one or more of the following factors: (a) percentage modifier, (b) pressure, (c) temperature, and (d) flow rate. For example, upstream and/or downstream pressure drops may be measured with different percentages of modifier. Similarly, upstream and/or downstream pressure drops may be measured at a plurality of pressures. Upstream and/or downstream pressure drops may be measured at a plurality of temperatures. Upstream and/or downstream pressure drops may be measured at a plurality of flow rates. The data so collected can be organized in a lookup table.

FIG. 6 illustrates Table 1, an exemplary lookup table in accordance with this embodiment of the invention with exemplary parameters and exemplary parameter values. FIG. 6 further illustrates exemplary interpolation based on intermediate parameter values.

Table 1 includes downstream pressure drop measurements (i.e., APs) from a chromatography system at different percentages of modifier, at different back pressure regulator pressures, at different temperatures, and at different flow rates. For example, Table 1 lists 200 psi as the downstream pressure drop measured with a 5% methanol co-solvent, at 2000 psi ABPR pressure, at 30° C. column oven temperature (where the ZV tee is kept), and at 2 mL/min flow rate set by the UPC2 instrument. Similarly, Table 1 lists 400 psi as the downstream pressure drop measured with the same conditions (i.e., a 5% methanol co-solvent, at 2000 psi ABPR pressure, and at 30° C. column oven temperature) except a 2.5 mL/min flow rate. The remainder of Table 1 can be understood following the same guidance.

Lookup tables in accordance with this embodiment of the invention may, additionally or alternatively, include upstream pressure drop measurements from the chromatography system. Lookup tables in accordance with this embodiment of the invention may include pressure drop measurements for more or less conditions. Similarly, lookup tables in accordance with this embodiment of the invention may include pressure drop measurements as a function of more or less factors.

A lookup table in accordance with this embodiment of the invention may be used to provide an upstream pressure drop and/or a downstream pressure drop in a chromatography system under conditions specified in the lookup table. For instance, exemplary Table 1 in FIG. 6 can be used to identify the relevant pressure drop in a chromatography system consistent with that used to develop Table 1 under the conditions specified in Table 1. Table 1 identifies 150 psi as the downstream pressure drop in a chromatography system consistent with that used to develop Table 1 with a 5% methanol co-solvent, at 2000 psi ABPR pressure, at 35° C. column oven temperature, and at 2 mL/min flow rate.

Similarly, a lookup table can be used to identify an upstream pressure drop and/or a downstream pressure drop in a chromatography system consistent with that used to develop lookup table under the conditions between those specified in the lookup table. For instance, exemplary Table 1 in FIG. 6 can be used to identify the downstream pressure drop in a chromatography system consistent with that used to develop Table 1 by interpolating between conditions specified in Table 1.

Before doing any interpolation based on the lookup table, a method in accordance with an embodiment of the invention will first check for a match in the table for all relevant conditions. If one of the relevant conditions does not appear in the lookup table, however, the method may interpolate a pressure drop based on the unspecified condition. For example, the method may interpolate a downstream pressure drop for a flow rate of 2.25 mL/min set by the UPC2 instrument because Table 1 identifies no downstream pressure drop for the 2.25 mL/min flow rate. Once it has been determined that the exact combination of conditions do not appear in the lookup table, the method in accordance with an embodiment of the invention will first match as many conditions appearing in the table as possible and then identify the values for the missing condition in the lookup table that are lower and higher than the target intermediate condition. For example, if the relevant conditions are a 5% methanol co-solvent, a 2000 psi ABPR pressure, a 30° C. temperature, and a flow rate of 2.25 mL/min, the method can identify pressure drop values in Table 1 that match all of those conditions except the flow rate. The method in accordance with an embodiment of the invention will identify 2 mL/min as the nearest lower flow rate value in Table 1 and 2.5 mL/min as the nearest higher flow rate value in Table 1. Thus, a downstream pressure drop of 300 psi can be interpolated for an intermediate 2.25 mL/min flow rate based on the 30° C. temperature, the 2000 psi pressure, and the 5% methanol co-solvent. Similarly, a downstream pressure drop of 245 psi can be interpolated for an intermediate 2.25 mL/min flow rate based on the 35° C. temperature, the 2000 psi pressure, and the 5% methanol co-solvent.

Before doing any interpolation based on the lookup table, a method in accordance with an embodiment of the invention will first check for the nearest matches in the table for a combination of relevant conditions. If two relevant conditions do not appear in the lookup table, the method may interpolate a pressure drop value for the two missing conditions. For example, if the relevant conditions are a 5% methanol co-solvent, a 2000 psi ABPR pressure, a 32.5° C. temperature, and a flow rate of 2.25 mL/min, the method can identify pressure drop values in Table 1 that match all of those conditions except the flow rate and temperature. A downstream pressure drop for a flow rate of 2.25 mL/min and a 32.5° C. temperature must interpolated from Table 1 because Table 1 includes no downstream pressure drop for that particular flow rate and that particular temperature. If interpolated values are available for one of the two missing conditions, the method in accordance with an embodiment of the invention will then identify the nearest values in the lookup table that are lower and higher than the other missing condition. For example, if pressure drop values for a flow rate of 2.25 mL/min are available, the method in accordance with an embodiment of the invention will identify 30° C. as the nearest lower temperature value in Table 1 and 35° C. as the nearest higher temperature value in Table 1. Building on the downstream pressure drop values interpolated for the intermediate 2.25 mL/min flow rate, a downstream pressure drop of 272.5 psi can be interpolated for the intermediate 2.25 mL/min flow rate, an intermediate 32.5° C. temperature, the 2000 psi pressure, and the 5% methanol co-solvent. The interpolated value of 272.5 psi is the mean of 300 and 245 psi.

A downstream pressure drop of 310 psi can be interpolated for an intermediate 2.25 mL/min flow rate based on the 30° C. temperature, the 2500 psi pressure, and the 5% methanol co-solvent. Similarly, a downstream pressure drop of 256.5 psi can be interpolated for an intermediate 2.25 mL/min flow rate based on the 35° C. temperature, the 2500 psi pressure, and the 5% methanol co-solvent. Building on the two foregoing downstream pressure drop values interpolated for the intermediate 2.25 mL/min flow rate, a downstream pressure drop of 283.25 psi can be interpolated based on the intermediate 2.25 mL/min flow rate, an intermediate 32.5° C. temperature, the 2500 psi pressure, and the 5% methanol co-solvent. The interpolated value of 283.25 psi is the mean of 310 and 256.5 psi.

Before doing any interpolation based on the lookup table, a method in accordance with an embodiment of the invention will first check for the nearest matches in the table for a combination of relevant conditions. If three relevant conditions do not appear in the lookup table, the method may interpolate a pressure drop value for the three missing conditions. For example, if the relevant conditions are a 5% methanol co-solvent, a 2250 psi ABPR pressure, a 32.5° C. temperature, and a flow rate of 2.25 mL/min, the method can identify pressure drop values in Table 1 that only match the percentage co-solvent. A downstream pressure drop for a flow rate of 2.25 mL/min, a 32.5° C. temperature, and a 2250 psi ABPR pressure must interpolated from Table 1 because Table 1 includes no downstream pressure drop for that particular flow rate, temperature, and pressure. If interpolated values are available for two of the three missing conditions, the method in accordance with an embodiment of the invention will then identify the nearest values in the lookup table that are lower and higher than the third missing condition. For example, if pressure drop values for a flow rate of 2.25 mL/min and a 32.5° C. temperature are available, the method will then identify the nearest values in the lookup table that are lower and higher than the target missing pressure. With respect to Table 1, the method in accordance with an embodiment of the invention will identify 2000 psi as the nearest lower ABPR pressure value in Table 1 and 2500 psi as the nearest higher ABPR pressure value in Table 1. Building on the downstream pressure drop values interpolated for the intermediate 2.25 mL/min flow rate and the intermediate 32.5° C. temperature, Table 1 can be used to estimate 277.9 psi as the downstream pressure drop in a chromatography system consistent with that used to develop Table 1 with the intermediate 2.25 mL/min flow rate, the intermediate 32.5° C. temperature, an intermediate 2250 psi ABPR pressure, and the 5% methanol co-solvent. The interpolated value of 277.9 psi is the mean of 272.5 and 283.25 psi.

Once the downstream pressure drop and/or upstream pressure drop is determined, that information may be used to better understand the average column pressure based on the average system pressure. Thereafter, the pressure parameters in the target system may adjusted to better match the average column pressure in the reference chromatography method. For example, if the average column pressure of the target system is greater than the average column pressure in the reference chromatography method, the back pressure regulator in the target system may be adjusted to a lower pressure and/or the pump pressure setting in the target system may reduced. Similarly, if the average column pressure of the target system is less than the average column pressure in the reference chromatography method, the back pressure regulator in the target system may be adjusted to a higher pressure and/or the pump pressure setting in the target system may increased. Thus, the performance of the chromatographic method in the reference system can be replicated with the same/similar chromatographic performance in the target system.

Figure 7:
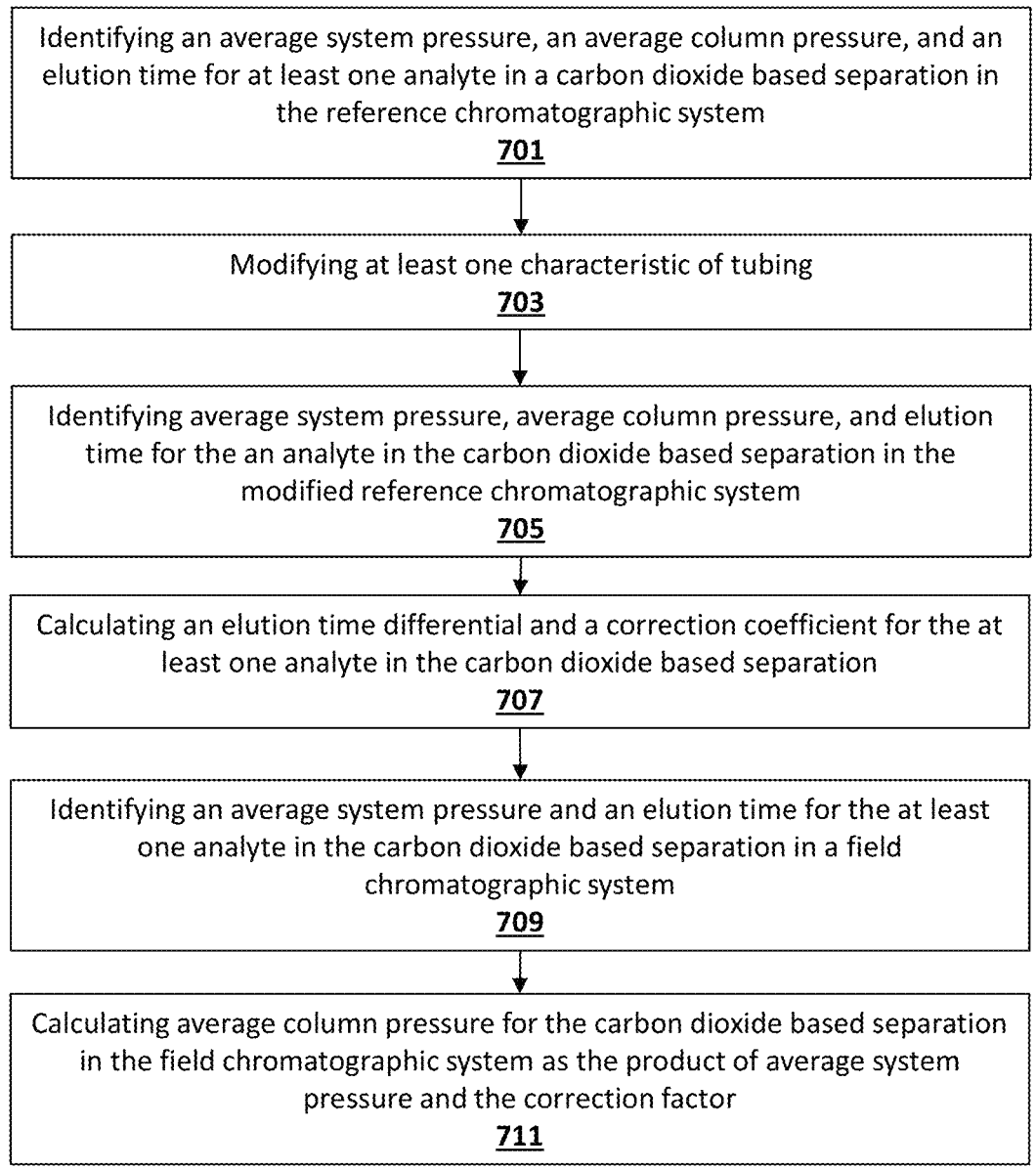
FIG. 7 illustrates a flow chart of an exemplary method of efficiently transferring a carbon dioxide based separation procedure from a reference chromatographic system to a field chromatographic system.

FIG. 7 shows an example flow chart of a method for efficiently transferring a carbon dioxide based separation procedure from a reference chromatographic system to a field chromatographic system. The method includes: identifying 701 an average system pressure, an average column pressure, and an elution time for at least one analyte in a carbon dioxide based separation in the reference chromatographic system; modifying 703 at least one characteristic of the tubing between a pump outlet and a column inlet or between a column outlet and a back pressure regulator inlet in the reference chromatographic system to create a modified reference chromatographic system; and identifying 705 an average system pressure, an average column pressure, and an elution time for the at least one analyte in the carbon dioxide based separation in the modified reference chromatographic system; and calculating 707 an elution time differential and a correction coefficient for the at least one analyte in the carbon dioxide based separation. The method further comprises identifying 709 an average system pressure and an elution time for the at least one analyte in the carbon dioxide based separation in a field chromatographic system; and calculating 711 an average column pressure for the carbon dioxide based separation in the field chromatographic system as the product of an average system pressure and the correction factor. The correction factor comprises a function of the elution time, the elution time differential, and the fitting coefficient for the at least one analyte in the carbon dioxide based separation.

What is claimed is:

1. A method for efficiently transferring a carbon dioxide based separation procedure from a reference chromatographic system to a field chromatographic system, the method comprising:
    (a) identifying an average system pressure, an average column pressure, and an elution time for at least one analyte in a carbon dioxide based separation in the reference chromatographic system;
    (b) modifying at least one characteristic of the tubing between a pump outlet and a column inlet or between a column outlet and a back pressure regulator inlet in the reference chromatographic system to create a modified reference chromatographic system;
    (c) identifying an average system pressure, an average column pressure, and an elution time for the at least one analyte in the carbon dioxide based separation in the modified reference chromatographic system;
    (d) calculating an elution time differential and a correction coefficient for the at least one analyte in the carbon dioxide based separation; and
    (e) identifying an average system pressure and an elution time for the at least one analyte in the carbon dioxide based separation in a field chromatographic system;
    (f) calculating an average column pressure for the carbon dioxide based separation in the field chromatographic system as the product of an average system pressure and a correction factor, wherein the correction factor comprises a function of the elution time, the elution time differential, and the correction coefficient for the at least one analyte in the carbon dioxide based separation; and (g) adjusting a pressure parameter in the carbon dioxide based separation in the field chromatographic system based on the calculated average column pressure.

2. The method of claim 1 wherein the at least one analyte comprises a first analyte and a second analyte;
wherein identifying an elution time for the at least one analyte in the carbon dioxide based separation comprises identifying a first elution time for the first analyte and a second elution time for the second analyte in the carbon dioxide based separation; and
wherein calculating an elution time differential and a correction coefficient for the at least one analyte in the carbon dioxide based separation comprises calculating a first elution time differential and a first correction coefficient for the first analyte and calculating a second elution time differential and a second correction coefficient for the second analyte; and
wherein the correction factor comprises a function of the first elution time, the first elution time differential, and the first correction coefficient for the first analyte and of the second elution time, the second elution time differential, and the second correction coefficient for the second analyte in the carbon dioxide based separation.

3. The method of claim 1 wherein the at least one analyte comprises a first analyte, a second analyte, and a third analyte;
wherein identifying an elution time for the at least one analyte in the carbon dioxide based separation comprises identifying a first elution time for the first analyte, a second elution time for the second analyte, and a third elution time for the third analyte in the carbon dioxide based separation; and
wherein calculating an elution time differential and a correction coefficient for the at least one analyte in the carbon dioxide based separation comprises calculating a first elution time differential and a first correction coefficient for the first analyte, calculating a second elution time differential and a second correction coefficient for the second analyte, and calculating a third elution time differential and a third correction coefficient for the third analyte; and
wherein the correction factor comprises a function of the first elution time, the first elution time differential, and the first correction coefficient for the first analyte; of the second elution time, the second elution time differential, and the second correction coefficient for the second analyte, and of the third elution time, the third elution time differential, and the third correction coefficient for the third analyte in the carbon dioxide based separation.

4. The method of claim 1 wherein modifying at least one characteristic of the tubing further comprises modifying at least one characteristic of the tubing between a pump outlet and a column inlet in the reference chromatographic system to create the modified reference chromatographic system;
the method further comprising
identifying an average system pressure, an average column pressure, and an elution time for the at least one analyte in the carbon dioxide based separation in the modified reference chromatographic system.

5. The method of claim 1 wherein modifying at least one characteristic of the tubing further comprises modifying at least one characteristic of the tubing between a column outlet and a back pressure regulator inlet in the reference chromatographic system to create the modified reference chromatographic system;
the method further comprising
identifying an average system pressure, an average column pressure, and an elution time for the at least one analyte in the carbon dioxide based separation in the modified reference chromatographic system.

6. The method of claim 1 wherein modifying at least one characteristic of the tubing further comprises modifying at least one characteristic of the tubing between a pump outlet and a column inlet in the reference chromatographic system to create a first modified reference chromatographic system; and modifying at least one characteristic of the tubing between a column outlet and a back pressure regulator inlet in the reference chromatographic system to create a second modified reference chromatographic system;
the method further comprising
identifying an average system pressure, an average column pressure, and an elution time for the at least one analyte in the carbon dioxide based separation in the first modified reference chromatographic system; and
identifying an average system pressure, an average column pressure, and an elution time for the at least one analyte in the carbon dioxide based separation in the second modified reference chromatographic system.

* * * * *